(12) United States Patent
Tavares et al.

(10) Patent No.: US 6,409,811 B1
(45) Date of Patent: Jun. 25, 2002

(54) ANTI-ABRASION INK ADDITIVES CONTAINING REDUCED AMOUNTS OF POLYTETRAFLUOROETHYLENE AND INKS CONTAINING SUCH ADDITIVES

(75) Inventors: Bruce Tavares, Blairstown, NJ (US); James Gambino, Yardley, PA (US)

(73) Assignee: Elementis Specialties, Inc., Hightstown, NJ (US)

( * ) Notice: Subject to any disclaimer, the term of this patent is extended or adjusted under 35 U.S.C. 154(b) by 106 days.

(21) Appl. No.: 09/706,401

(22) Filed: Nov. 6, 2000

(51) Int. Cl.[7] .......................... C09D 11/00; C08L 91/06
(52) U.S. Cl. ................. 106/31.29; 106/31.62; 106/272; 106/245
(58) Field of Search .......................... 106/31.29, 31.61, 106/272, 245, 31.3, 31.62

(56) References Cited

U.S. PATENT DOCUMENTS

| | | | | |
|---|---|---|---|---|
| 5,158,606 A | * | 10/1992 | Carlick et al. | 106/31.61 |
| 5,749,949 A | * | 5/1998 | Tavares | 106/272 |
| 5,898,022 A | * | 4/1999 | Maples | 508/113 |

* cited by examiner

*Primary Examiner*—Helene Klemanski
*Assistant Examiner*—Veronica F. Faison
(74) *Attorney, Agent, or Firm*—Michael J. Cronin

(57) ABSTRACT

An anti-abrasion additive for ink formulations includes sintered polytetrafluoroethylene in a reduced amount; a petrolatum; and a high melting point microcrystalline wax. The additive, when dispersed in an ink, provides the ink with good slip, abrasion resistance, low misting, and mar resistance.

19 Claims, No Drawings

ANTI-ABRASION INK ADDITIVES CONTAINING REDUCED AMOUNTS OF POLYTETRAFLUOROETHYLENE AND INKS CONTAINING SUCH ADDITIVES

FIELD OF THE INVENTION

The present invention relates to anti-abrasion additives for inks. Such additives are chemicals mixed or dispersed into ink formulations in order to impart strength and anti-rub properties to such inks after printing. These additives are also called anti-mar, anti-rub, or anti-slip ink additives. Print on paper using inks containing these additives, for example, is protected against abrasion while maintaining slip properties when the ink, and the paper or other material, is subjected to a variety of smearing, smudging, and marring forces. Such forces occur during use, shipping, or handling of the paper.

The anti-abrasion additives of the present invention are most useful for heat-set, sheet-fed, and UV-coatable printing inks.

BACKGROUND OF THE INVENTION

Inks, particularly printing inks, must be provided with "strength" properties so that, after printing on paper or other substrates, the printing ink will not ruboff when the substrate surface is subjected to the normal abrasive forces encountered in use and handling. The printing ink, as modified by the ink manufacturer with anti-abrasion specialty chemicals, possesses improved mar resistance. Marring or "abrasion" of print detracts from the readability. Treated ink, after addition of these special additives, often also will have improved slip properties. Slip properties permit other printed pages to glide easily over the ink on a printed page without causing the ink to smudge.

In order to obtain these improved properties, anti-abrasion additives are added to printing ink formulations during manufacture by being mixed or ground into the ink formulation with pigments; added as a part of the final ink blend; or introduced at other times. Such additives are, for example, often dispersed into the precursor ink solvents or resins.

Commercial ink additives are often made in solid or powder form often as hard waxes. Harder waxes have proved difficult to mix satisfactorily or disperse into ink systems as additives. It has often been necessary to melt the wax additive as part of making the final printing ink. It ha s been found that anti-abrasion or rub qualities imparted by common commercial waxes are highly influenced by the melting temperature of a particular wax. Many waxes add ed to inks often result in only a small reduction in rub-off, not its complete elimination. The heat and movement imparted by the friction of constant rubbing in practice sometimes results in particles of the ink printed film continuing to spread to unprinted areas.

Progress does not always have no downside. Anti-abrasion hard waxes introduced into inks to solve the rub-off problem have caused other problems. Often, the more wax additive that is added to improve rub resistance, the more significant the decrease in desirable gloss of the printed ink, which is particularly unsatisfactory for quality magazines or prints. It is important to a publisher to minimize this reduction in gloss of printed ink. Accordingly, in most applications a compromise has to be achieved between the desired level of anti-rub properties and the a mount of gloss reduction.

An additive which requires heating, as do most hard wax anti-abrasion additive products, also presents additional manufacturing costs and handling problems. Since many anti-abrasion waxes are either solids or in powder form, they are often difficult to disperse into formulations, which are essentially liquid systems. In addition, there is the factor of increased cost associated with an ink containing relatively expensive anti-mar additives—reading a newspaper can be an experience requiring at a minimum a washing of ones hands. In the case of newspaper and certain magazine news inks, cost is an important factor and, therefore, many news inks do not ordinarily utilize anti-abrasion additives. Inexpensive magazine inks use only limited varieties and small amounts of additives.

Polyethylene waxes have been used as anti-abrasion additives in the ink industry. These waxes are normally incorporated by the ink manufacturer as dispersions of the wax in resins, generally of the same type as the ink formulations into which they are to be incorporated.

Anti-abrasion additives containing certain types of polytetrafluoroethylene (PTFE) are often the choice for heat-set inks, where the temperature of the drying apparatus does not cause them to significantly soften or melt. Particular kinds of polytetrafluoroethylene-based powders combined with organic chemicals have also been added directly to in-process inks using shear forces.

The incorporation of many commercial anti-abrasion additives presents similar conventional handling problems as are encountered with the dispersion of other types of solid or nearly-solid materials. When added to ink systems, these types of additive can agglomerate into clumps. When dispersed directly, uneven "wetting out" of the product has been reported resulting in the formation of lumps or globules whose core remains hard. Such agglomeration can be reduced in many cases by adding the additive to the system slowly with agitation. Slow dissolution, however, often influences the efficiency of specific ink manufacturing operations. Some chemicals have proved difficult to incorporate in industrial ink-making processes because they require long periods of time to dissolve. Both in simple ink resin solutions and, more particularly, in ink formulations comprising other chemicals and ingredients, extended agitation and aging periods are necessary before correct viscosity and dispersion is attained.

Ink manufacturers have continually searched for simple, fast, and effective ways of mixing anti-abrasion additives into ink systems. Because of this continuing desire and investigation, some commercial products are today used by ink fabricators as pourable liquid concentrates. These additives, in liquid form for inks and other compositions, usually involve taking the additive sold by a anti-abrasion additive manufacturing company and preparing a pre-mix liquid mixture or blend of the anti-abrasion additive and the ink vehicle.

Anti-rub PTFE-containing additives commercially available on the market include Protech 120, sold by Carroll Scientific, Inc. which is described as an 83% active compound containing a form of DuPont virgin Teflon®, which is a tradename for PTFE, and a synthetic blend of chemicals, with a petroleum distillate vehicle. Lawter International, sells an anti-rub hard wax ink additive product, designated Lawter SA-1021, which comprises a phenolic resin, a type of polytetrafluoroethylene (PTFE), and a petroleum oil. Commercial anti-rub additives containing PTFE have also been sold in the past which have contained small amounts of polyalphaolefins. All these products are believed to contain PTFE in an amount of 35% or greater.

A number of prior art patents describe ink additives. U.S. Pat. No. 5,024,700 describes the use of triethanolamine as an ink additive, which among other properties, is described as providing improved rub resistance to oil and resin-based ink compositions.

U.S. Pat. No. 5,158,606 describes a printing ink composition with a high degree of rub-off resistance comprising a dispersion of a pigment in a vehicle containing a $C_7$–$C_{40}$ oil and a polymer latex emulsified in the dispersion. The patent further discloses that, where cost is not of paramount concern, a PTFE wax with petrolatum can be added to the oil/polymer latex ink composition.

U.S. Pat. No. 3,843,570 describes a porous material comprising PTFE obtained by polymerizing a monomer capable of forming a resin and discloses that the material is suitable with inks.

U.S. Pat. No. 5,591,796 discloses a pumpable anti-abrasion/slip additive comprising a mixture of about 40–70 wt. % polytetrafluoroethylene and polyalphaolefin. U.S. Pat. No. 5,749,949 discloses an anti-abrasion/slip additive comprising a mixture of about up to 60 wt. % polytetrafluoroethylene and about 25–45 wt. % pharmaceutical grade petrolatum. U.S. Pat. Nos. 5,591,796 and 5,749,949, owned by the assignee of the present invention, are incorporated by reference in their entirety. For many years, the increasing cost of PTFE, and its growing unavailability, have lead ink-making companies to seek anti-abrasion additives which use far less PTFE but provide substantially the same properties as high PTFE products. Until now, this search has not met much success.

It is therefore an object of the present invention to provide an anti-rub ink additive with equal or improved mar and rub properties as compared to existing additives which uses less PTFE. Along with the significant advantages and cost savings that can be realized in shipping a anti-abrasion additive which contains less PTFE, such a product has the added advantage of being largely free of resins and solvents.

It is a more specific object of the present invention to provide a reduced PTFE slip, anti-rub and anti-mar ink additive which is useful for increasing the performance properties of inks in an improved and efficient manner. The additive of the present invention maintains good gloss and degradation properties in the ink formulations in which it is used.

DETAILED DESCRIPTION OF THE INVENTION

The anti-abrasion additive composition for ink formulations of the present invention is a mixture comprising by weight (a) from 1 to 30% sintered polytetrafluoroethylene (PTFE); (b) from 40 to 70% of one or more petrolatums; (c) from 10 to 30% of one or more microcrystalline waxes having a melting point greater from 190° F.; and (4) optionally an alkyd resin.

The invention also includes an ink composition where the additive composition described above is present in the ink in an amount of about 1–20 wt. %, preferably about 5–10 wt. %, and more preferably about 7–8 wt. % of the ink.

The combination of reduced amounts of sintered PTFE, microcrystalline wax of a particular type, and preferably pharmaceutical grade petrolatum leads to a cost-effective additive having synegistic properties, such as good slip, abrasion resistance, low misting and mar resistance when dispersed into ink. Further, the amount of highly expensive PTFE used can surprisingly be substantially reduced (e.g., by 50–75%) in comparison to known anti-abrasion ink additives containing PTFE, thereby resulting in significant cost savings.

The preferred forms of PTFE useful for the present invention are high molecular weight types (e.g., as high as 40 million weight average molecular weight), which have been pre-ground and are in a powder form.

The PTFE to be used must be sintered during or after its fabrication. This sintering involves the agglomeration of PTFE at temperatures slightly below or slightly above its melting point. Such sintering increases the PTFE's density and strength as a ink additive. While heat and pressure are essential for sintering, a decrease in the surface area of the PTFE is probably the more important factor to achieve the desired results of the present invention.

Types of polytetrafluoroethylene preferred for the present invention are preformed under pressure into a desired shape, and then sintered at atmospheric pressure in an oven at a temperature in the range of from about 700° F. to about 750° F. Other types of useful PTFE can be preformed under pressure and sintered under pressure, normally at a temperature in the range of from about 600° F. to about 750° F. The sintered PTFE is present in the additive in an amount of about 1 to 30 wt. %, preferably about 5 to 20 wt. % and most preferably about 15–17.5 wt. %, based upon the weight of the additive.

Many types of sintered PTFE powder useful for the present invention are often referred to as granular, since they are of a small particle size and have a grainy texture in that the particles are not smooth and even-shaped.

In the present invention, irradiated and sintered PTFE in powder form is preferred. Irradiation of sintered PTFE is normally preferred to facilitate micronization of PTFE into a useable powder form for the use of the present invention. However, irradiation of unsintered PTFE can also produce micronized PTFE. See U.S. Pat. No. 4,036,718. The term "irradiation", when used with PTFE, is defined as exposure to wavelengths shorter than those of visible light, including alpha-rays, beta-rays, gamma-rays, X-rays, electron beams, ultra-violet (UV) rays, neutron beams, proton beams, and the like. Particularly preferred for the present invention are virgin irradiated sintered grades and similar reprocessed grades. Specific useful irradiated sintered PTFE types include virgin granular products.

Micronization of the sintered PTFE to a particle size of about 2 to 20 microns is preferred. Sintered PTFE having an average particle size of about 2 to about 10 microns is more preferred with 2 to 5 microns (with less than 1% of the particles being greater than 10 microns) most preferred. Micronization can be accomplished by a variety of techniques, including milling and grinding.

Average and median particle size can be determined by mesh and screen tests as well as by the use of other more accurate tests when dealing with finely divided PTFE. See, for example, the tests described in U.S. Pat. No. 3,983,200 and U.S. Pat. No. 4,036,718.

Both off-specification and recycled or reprocessed sintered PTFE, as well as virgin PTFE, can be utilized to make products useful in the present invention. Mixtures of various types of PTFE are also useful. A most preferred PTFE useful for the present invention is an irradiated, sintered, granular-type product which had been micronized to about a 2.5 micron average particle size.

PTFE of the kind useful for this invention can usually be obtained as a special order product from a variety of companies, including DuPont, Royce Company, Imperial Chemicals International, Ltd. (ICI), Hoescht (Germany), Cray Valley, Ltd., North American Fluorpolymer, Shamrock/MP Company, Ausimont, Daikin, and PTK International Limited. In a preferred embodiment, the sintered PTFE used in the present invention is SST-4SO (Chemical Abstract 9002-84-0), available from Shamrock Technologies, Inc. of New Jersey.

The second element for producing the additives of the present invention is petrolatum, preferably pharmaceutical grade petrolatum, also called laboratory grade petrolatum. Petrolatum is a mass of salve-like consistency obtained from crude oil and is chemically related to white mineral oil. In contrast to white mineral oil which consists mainly of hydrocarbons that are liquid at ordinary temperatures, petrolatum is most often a mixture of solid and liquid hydrocarbons.

Petrolatum is generally obtained from paraffin-base and mixed-base crude oils. The method of manufacture varies with the type of petroleum used, the grade of petrolatum desired, and the general program of the individual refinery. Most petrolatums are largely slack wax and are of low grade with a high oil content. This type and other types of crude petrolatum are then purified to meet U.S. Pharmacopoeia (USP) and FDA purity requirements by high pressure/high temperature hydrogenation.

The USP specifications for pharmaceutical grade petrolatum generally require the following:

1. Color—yellowish to light amber
2. Specific Gravity—0.815 to 0.880 at 60° C.
3. Melting Point—38.degree. C. to 60° C.
4. Consistency—100 to 275
5. Residue on Ignition—0.0% max.
6. Organic Acids—none
7. Fixed Oils, Fats and Rosins—none To aid in selecting the proper grade of petrolatum for a given purpose and establishing specifications, the American Society for Testing Materials (ASTM) has developed many test methods. These following test methods are widely accepted as standards throughout the industry:

A. Melting Point

ASTM D938 is used to determine the congealing point of petrolatums. The congealing point is the temperature at which the material solidifies while cooling.

USP melting (ASTM D-127) is used to determine the drop melting point of petrolatums. The melting point is determined to be the temperature at which the first drop of petrolatum drops from the thermometer while heated under specified conditions.

B. Consistency (Penetration)

ASTM D 937 determines the consistency (hardness or softness) of petrolatums; the lower the numerical value, the harder the petrolatum.

C. Viscosity

ASTM D 445 and ASTM D 2161 are methods for the measurement of the kinematic viscosity in centistokes and of the conversion to Saybolt viscosity in Saybolt Universal Seconds (SUS), respectively. Both methods measure mobility of molten petrolatum, usually at 210° F. or 100° C.

D. Flash Point

ASTM D 92 is the procedure for determining the flash and fire points of petroleum products by the Cleveland Open Cup Tester.

Particularly preferred petrolatums for this invention are Witco Chemical Companys' Protopet®, Perfecta®, and Fonoline® grades. Witco Protopet® 1S (Chemical Abstract CAS# 8009-03-8) has the following specifications and typical properties:

| Properties | Test Method To Determine | Range |
|---|---|---|
| Specific Gravity @ 60° C./25° C. | LATM 128 | 0.815/0.880 |
| Melting Point, ° C. | ASTM D127 | 54.4/60.00 |
| Consistency | ASTM D937 | 180/210 |
| Residue on ignition | USP 23 | Passes |
| Organic Acids | USP 23 | Passes |
| Alkalinity | USP 23 | Passes |
| Acidity | USP 23 | Passes |
| Fixed oils, fats, and rosin | USP 23 | Passes |
| Color | USP 23 | Passes |
| Lovibond Color, 2' Cell, Y | IP 17 | 1.5/2.0 |
| Odor rating, panel average | LATM 093 | 1.0 Max. |
| Congealing Point, ° F. | ASTM D938 | 115/128 |
| Viscosity @ 210° F., SUS | ASTM D445 | 60/75 |
| Flash Point, COC, ° .F. | ASTM D92 | 420 |

Protopet® 1S is a Petrolatum USP meeting requirements for USP 23 and FDA requirements as per 21 CFR 172.880. A preferred embodiment of the instant invention contains about 40 to 70 wt. % of pharmaceutical grade petrolatum based upon the weight of the additive with a preferred range of 50 to 70 wt. %.

The final necessary chemical, element (c), is a defined microcrystalline wax; such microcrystalline wax should be present in the additive in an amount of about 10 to 30 wt. %, preferably about 10 to 20% and most preferably about 12.5 wt. %, based upon the weight of the additive.

For background, the family of microcrystalline waxes come from either the distilling tower tank bottom or from the distillation residue of crude oil. These waxes have a molecular weight range from about 100 to 1500 and a melting point range from about 165° F. to 220° F.

For purposes of this invention it has been discovered that waxes having a melting temperature greater than 190° F. are a critical criteria, the preferred embodiment being a wax of 190° F. to 200° F. melting temperature. Chemically, the microcrystalline waxes used in this inventive have much greater branching than paraffins and a much smaller crystal size. Microcrystalline waxes are useful in the inventive ink additive because of their lower costs (compared to PTFE), and surprisingly good inherent slip, likely resulting from their higher melting point.

Preferred microcrystalline waxes are made up of paraffinics, iso-pararrinics, branched paraffinics and cycloparaffinics. These waxes are compounded readily.

A particularly preferred microcrystalline wax is Astor Wax 9508 (Chemical Abstract CAS# 64742-42-3) available from Honeywell Specialty Chemicals of Pennsylvania. This microcrystalline wax has an oil content of about 1.8 wt. % as measured by ASTM D 721 and has a melting point of about 192–194° F. as measured by ASTM D 127. Such a microcrystalline waxes, having a high melting point and high purity (i.e., low oil content), surprisingly imparts improve handling and dispersion properties to the ink.

Alkyd resin is an optional ingredient in the anti-abrasion ink additive of this invention. The alkyd resin may, but need not, be present in the ink additive in an amount up to about 20 wt. % based upon the weight of the additive. Such alkyd resin is preferably a soya resin. A preferred alkyd resin is Alkyd 4630 (Chemical Abstract CAS# 66071-86-1), which is a soybean-based isophthalic alkyd available from the Degen Company of New Jersey.

Further additional chemicals which can be optionally added to the inventive composition include narrow cut petroleum oils, soluble hydrocarbon, or phenolic resins. For example, the additive may contain about 5–15 wt. % of a petroleum oil and about 5–15 wt. % of a hydrocarbon or phenolic resin.

A preferred type of petroleum oil are Magie Oils, printing ink oil solvents which are narrow-cut oils made and sold by Magie Brothers Inc., a division of Pennzoil. The commercial products designated Magie Oil 47 and 470 are particularly preferred. Also useful are oils designated Amprint 231 from Total Petroleum and a similar line of oil products sold by Exxon Corp. Hydrocarbon resins supplied by Neville Chemical Company, Pittsburgh, Pa., designated Nevchem 110 and Nevchem 140, are representative of a much larger variety of hydrocarbon resins useful in the present invention. Also useful are resins sold by (1) Arizona Chemical, Panama City, Fla. particularly Betabrene® and Betalite® including Betabrene 255, and (2) Resinall Corporation, North Carolina particularly Resinall® 737, 747, 771 and 784. Phenolic resins are sold by Arizona Chemical and include Beckatite® 112, 115, 6004 and 6006.

The composition of the present invention can be prepared with a wide variety of industrial mixing apparatus, including media mills, pug mills, and paddle mixers. Other types of similarly useful apparatus are well known in the art. The starting chemicals can be added together in any order with the addition of petrolatum being added first and then the PTFE added as a preferred method. The mixture is then mixed, sheared or stirred for a period of time necessary to achieve satisfactory dispersion, which can be in some cases are no longer than a few minutes up to several hours.

In many embodiments, the resultant mixture product will have the consistency of smooth light cream and be pumpable; often the mixture will have a creamy-white color as well, and will be non-gritty to the touch in view, in part, because of its reduced use of PTFE.

While "pourable" and "pumpable" are terms resisting precise definitions, they are given a working definition in this application as follows: (a) "pourable" in general means that the product exhibits 15,000 cps viscosity or less at 77° F., as measured with a Brookfield RVT Micrometer at 50 rpm employing a #4 spindle. Examples of products that are pourable include honey, molasses, and dishwasher liquids.

(b) "Pumpable" products exhibit 15,000 cps or less in viscosity at the shear rate of the pump. Pumpable products would include pourable products. Pumpable substances could be non-pourable (up to 75,000 cps) under static condition, but drop to 15,000 cps or less under shearing, because of their shear thinning response. Examples of pumpable products would include: construction pastes and grouts, mayonnaise-type substances, and soft shoe polishes.

In a currently preferred embodiment according to the present invention, the ink additive composition is made in a simple manner. The petrolatum is heated to about 140° F. to ensure that it is pourable and is then placed into a vessel. An alkyd resin is optionally added. The vessel is the heated and stirred. At about 165° F., sintered PTFE is slowly added to the vessel. After about 15–30 minutes to ensure that the sintered PTFE is dispersed, microcrystalline wax is added to the vessel. The vessel is then heated to about 212° F. and held at that temperature for about 30 minutes to ensure that the wax is fully dissolved. The vessel is then cooled. The ink additive product is discharged at about 165–175° F.

The anti-abrasion composition can be easily mixed into an ink system using conventional mixing equipment, such as medium and high-speed dispersing apparatus, and similar such mixture apparatus. Substantially less time and shear effort will be necessary to obtain effective dispersion of the inventive additives compared to many present-day commercial products. The additives of the present invention are particularly useful in quality inks used for magazine covers and color advertising inserts commonly contained in magazines.

The ink additive of the present invention, particularly those that are pumpable, can easily be dispersed in most ink liquids. The ink additive can be added directly to a ink master batch by using an appropriate mixer.

Printing ink compositions using the present invention may be prepared by conventional techniques, e.g. by preparing a dispersion of the pigment in the ink vehicle and adding the additive. One preferable procedure for preparing ink compositions of the present invention is as follows: (a) disperse the ink pigment in a vehicle, thereby forming an ink formulation; and then (b) disperse the inventive additive into the ink formulation, and then mixing the ink formulation for a brief period of time.

A preferred printing ink composition may be made as follows: (a) prepare a dispersion of 5–30 wt. % ink pigment in 70–90 wt. percent of an ink vehicle; and (b) add at a 5–10 wt. %, based on the weight of the ink composition, the inventive additive, incorporating it in the above dispersion.

The inventive anti-abrasion/slip compositions provide substantially improved anti-abrasion properties, including better mar and slip, to a wide variety of printing inks compared to present additives. Since the additives are pumpable, elaborate heating and mixing apparatus is often not required, and the additives are as a result cheaper to use.

The following example is designed to assist those skilled in the ink formulation and additive art to practice the present invention, but are not intended to limit the wide scope of the invention. Various modifications and changes can be made without departing from the essence and spirit of the invention. The various chemicals used in the examples are commercial materials, except for the inventive compositions.

EXAMPLE

Test results of various additives were run in two printing ink formulations of the type made by the Sun Printing Ink Company; one was a sheet feed ink formulation; the second was a heat set formulation. The test was a Sutherland rub test well known in the industry. A 24 hour test period was first used; a longer test period of 48 hours was then used. Three additives were formulated as follow:

| Additive | Composition |
|---|---|
| A | 45% P.T.F.E., 30% resin, 25% ink oil (control) |
| B | 15% P.T.F.E., 60% Petroletum, 25% microcrystalline wax |
| C | 17.5% P.T.F.E., 60% Petroletum, 12.5% microcrystalline wax, 10% Alkyd compound |

A rating system for the Sutherland rub test results of inks containing the additives was utilized. A rating of "0" was determined for inks containing no anti-abrasive additive in view of their heavy marring, a rating of "6" was determined for the high PTFE control and higher readings obtained for both inventive runs. Note a value of "10" would be given to a perfect rub test with no rub-off of the ink.

In the case of the sheetfed inks, the rating system was further refined in that the values of "0" and "6" (for the blank and controls, respectively) were determined for the rubs after 24 hours aging of the ink drawdowns; the 48 hour aging drawdowns, then, were subject to the same rating system as the experimental samples.

Following, are the results obtained:

| Rub-Off Ratings-Sutherland Rub Tester | | | |
|---|---|---|---|
| | Sheetfed | | |
| Additive Composition | 24 hr | 48 hr | Heatset |
| High PTFE Control-Additive A | 6 | 6 | 6 |
| Inventive Additive B | 8 | 7.5 | 8 |
| Inventive Additive C | 9 | 8.5 | 6 |
| No Additive | 0 | 0 | 0 |

Discussion: From these results, it is clear that the reduced PTFE experimental additives offer rub performance at least equal, and in several areas better, than the 45% PTFE containing control additive.

The foregoing background, description and examples have been set forth merely to illustrate the invention and are not intended to be limiting. Since many modifications and simple changes of the disclosed embodiments incorporating the spirit and substance of the invention may occur to persons skilled in the art, the invention should be construed to include everything within the scope of the appended claims, equivalents thereof and obvious variations thereof.

What is claimed is:

1. An anti-abrasion additive for ink formulations, comprising by weight:
   a) from 1 to 30% sintered polytetrafluoroethylene;
   b) from 40 to 70% at least one pharmaceutical grade petrolatum; and
   c) from 10 to 30% of at least microcrystalline wax having a melting point greater than 190° F.

2. An additive according to claim 1, wherein said sintered polytetrafluoroethylene is present in an amount of about 15–17.5 wt. % of the additive.

3. An additive according to claim 1, further comprising an alkyd resin.

4. An additive according to claim 2, wherein said alkyd resin is a soybean-based isophthalic resin.

5. An additive according to claim 1, wherein said sintered polytetrafluoroethylene is irradiated sintered polytetrafluoroethylene.

6. An additive according to claim 1, wherein said sintered polytetrafluoroethylene has an average particle size of from about 2 to about 10 microns.

7. An additive according to claim 1, wherein said at least one petrolatum is a pharmaceutical grade petrolatum meets the U.S. pharmacopeia standard.

8. An additive according to claim 1, wherein said microcrystalline wax has an oil content of about 1.8 wt. % and has a melting point of about 192–194° F.

9. An additive according to claim 1, wherein said at least one petrolatum is present in an amount of about 50–70 wt. % of the additive.

10. An additive according to claim 1, wherein said microcrystalline wax is present in an amount of about 10–20 wt. % of the additive.

11. An anti-abrasion additive for ink formulations, comprising:
    a) 5 to 20 wt. % of sintered polytetrafluoroethylene;
    b) 50 to 70 wt. % of one or more petrolatums; and
    c) 10 to 30 wt. % of at least one microcrystalline wax having a melting point greater than 190° F.

12. An anti-abrasion additive according to claim 11, further comprising an alkyd, a petroleum oil and a resin selected from the group consisting of a hydrocarbon resin and a phenolic resin.

13. An ink comprising the anti-abrasion additive according to claim 1.

14. An ink according to claim 13, wherein said additive is present in an amount of 1–20 wt. % based upon the weight of the ink.

15. An ink according to claim 13, wherein said ink is selected from the group consisting of heat-set inks; ultra-violet radiation-curable inks; sheet-fed inks; paste inks; and lithographic inks.

16. A process for preparing an anti-abrasion ink additive, comprising:
    a) heating at least one petrolatum;
    b) placing the heated at least one petrolatum into a vessel;
    c) heating and stirring the at least one petrolatum;
    d) adding sintered polytetrafluoroethylene to the vessel;
    e) adding a microcrystalline wax with a melting point greater than 190° F. to the vessel;
    f) heating the vessel, thereby dissolving the microcrystalline wax;
    g) cooling the vessel; and
    h) discharging the ink additive.

17. A process according to claim 16, wherein said heating the at least one petrolatum is to a temperature of about 165° F.

18. A process according to claim 16, wherein said discharging is at a temperature of about 165–175° F.

19. An anti-abrasion additive for ink formulations made according to the process of claim 16.

* * * * *